(12) United States Patent
Fisher et al.

(10) Patent No.: US 7,704,916 B2
(45) Date of Patent: Apr. 27, 2010

(54) COMPOUND HAVING A PYROCHLORE-STRUCTURE AND ITS USE AS A CATALYST CARRIER IN WATER GAS SHIFT REACTION

(75) Inventors: Janet Mary Fisher, Reading (GB);
David Thompsett, Reading (GB);
Richard Ian Walton, Warks (GB);
Christopher Stuart Wright, Poole (GB)

(73) Assignee: Johnson Matthey PLC, London (GB)

(*) Notice: Subject to any disclaimer, the term of this patent is extended or adjusted under 35 U.S.C. 154(b) by 320 days.

(21) Appl. No.: 11/663,258

(22) PCT Filed: Sep. 7, 2005

(86) PCT No.: PCT/GB2005/003428
§ 371 (c)(1),
(2), (4) Date: Jul. 20, 2007

(87) PCT Pub. No.: WO2006/030179
PCT Pub. Date: Mar. 23, 2006

(65) Prior Publication Data
US 2007/0269359 A1    Nov. 22, 2007

(30) Foreign Application Priority Data
Sep. 18, 2004   (GB) .................. 0420794.0

(51) Int. Cl.
*B01J 23/00* (2006.01)
*B01J 23/10* (2006.01)
*B01J 23/32* (2006.01)
*B01J 23/58* (2006.01)
*B01J 23/02* (2006.01)

(52) U.S. Cl. .............. 502/302; 502/303; 502/304; 502/324; 502/330; 502/344; 502/350; 502/352

(58) Field of Classification Search ......... 502/302–304, 502/324, 330, 344, 350, 352
See application file for complete search history.

(56) References Cited

U.S. PATENT DOCUMENTS 3,801,490 A * 4/1974 Welch .................. 205/625
3,962,068 A * 6/1976 Zollner et al. .......... 204/290.12
3,972,837 A * 8/1976 Acres et al. ................. 502/328

(Continued)

FOREIGN PATENT DOCUMENTS

EP    0 532 024 A1    3/1993

(Continued)

OTHER PUBLICATIONS

Written Opinion for PCT/GB05/03428.*

(Continued)

*Primary Examiner*—Patricia L Hailey
(74) *Attorney, Agent, or Firm*—RatnerPrestia

(57) ABSTRACT

A compound of formula $(Na_{0.33}A_{0.66})_2B_2O_{7-\delta}$ wherein A is one or more metals chosen from the lanthanide metals; B is one or more metals chosen from Ti, Sn, Ge, Ru, Mn, Ir, Os and Pb; and $\delta$ is a number in the range 0-1 is disclosed. Water gas shift catalysts comprising precious metals such as gold dispersed on the $(Na_{0.33}A_{0.66})_2B_2O_{7-\delta}$ compound are also disclosed.

12 Claims, 1 Drawing Sheet

U.S. PATENT DOCUMENTS 4,127,510 A * 11/1978 Harrison et al. ............. 502/303
4,313,925 A * 2/1982 Bamberger ................. 423/263
6,455,182 B1 9/2002 Silver

FOREIGN PATENT DOCUMENTS

JP 2003-236380 8/2003
WO WO-02/096559 A1 12/2002

OTHER PUBLICATIONS

Toshio Nakatani et al., Preparation of Mixed Oxide Powders in the Systems $ZrO_2 0M_xO_y$, and $[20CeO_2\text{-}80ZRO_2(mol\%)]\text{-}M_2O_y$, from Zirconium Sulfated Slurry for the Purification Catalysts of Automotive Emission, *Materials Science Research International*, vol. 10, No. 1, pp. 53-57 (2004).

Laurence A.J. Garvie et al., "Synthesis of $(Ca,Ce^{3+},Ce^{4+})_2Ti_2O_7$: a pyrochlore with mixed-valence cerium," *Journal of Physics and Chemistry of Solids* 66 (2005) 902-905.

Serguei Koutcheiko et al., "Electrical, thermal and catalytic properties of $CeO_2\text{-}Sm_{0.5}Ti_{0.5}O_{1.75}$ ceramics," *Ceramic International* 31 (2005) 965-971.

* cited by examiner

US 7,704,916 B2

COMPOUND HAVING A PYROCHLORE-STRUCTURE AND ITS USE AS A CATALYST CARRIER IN WATER GAS SHIFT REACTION

CROSS-REFERENCE TO RELATED APPLICATIONS

This application is the U.S. National Phase application of PCT International Application No. PCT/GB2005/003428, filed Sept. 7, 2005, and claims priority of British Patent Application No. 0420794.0, filed Sept. 18, 2004.

FIELD OF THE INVENTION

The present invention relates to a novel compound and its use as a catalyst support material in a water gas shift catalyst.

BACKGROUND OF THE INVENTION

The water gas shift (WGS) reaction converts carbon monoxide and water to carbon dioxide and hydrogen:

$$CO + H_2O \rightarrow CO_2 + H_2$$

So-called "low temperature" WGS catalysts catalyse the WGS reaction at temperatures of 200-400° C. WGS catalysts are commonly used in reformer systems to reduce CO concentration.

WGS catalysts typically comprise a metal dispersed on the surface of a high surface area support material. Commonly used support materials for WGS catalysts include alumina, titania, ceria and iron oxide. The support material must be durable and the nature of the support material can affect the activity of the WGS catalyst. The present inventors have sought to develop a catalyst support material that is durable and that can be used to provide WGS catalysts with high activity, particularly at low temperatures.

SUMMARY OF THE INVENTION

Accordingly the present invention provides a compound of formula

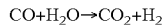
$(Na_{0.33}A_{0.66})_2B_2O_{7-\delta}$ wherein A is one or more metals chosen from the lanthanide metals; B is one or more metals chosen from Ti, Sn, Ge, Ru, Mn, Ir, Os and Pb; and δ is a number in the range 0-1.

The compound has the pyrochlore structure and has been used to prepare catalysts with excellent low temperature water gas shift activity.

DETAILED DESCRIPTION OF THE INVENTION

Figure 1:
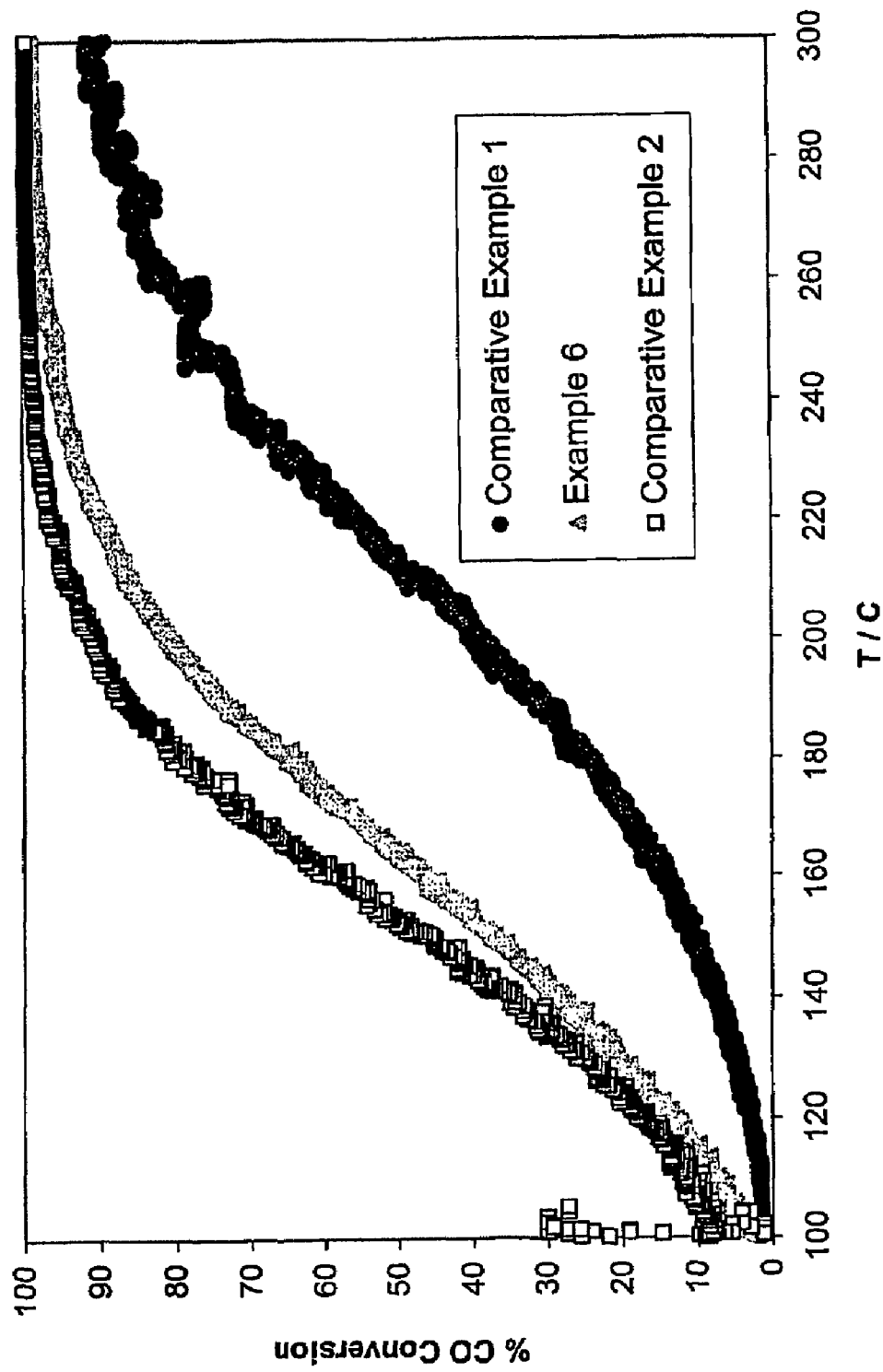
FIG. 1 is a graph depicting the activities of catalysts according to an embodiment of the present invention and two comparative examples, as a function of temperature.

A is suitably one or more metals chosen from the lanthanide metals, including at least Ce. A is preferably one or more metals chosen from Ce, Pr and Tb. If A is more than one metal chosen from the lanthanide metals, then preferably at least 70 atomic percent of A is Ce. Ce is in the 4+ oxidation state, but the other lanthanides may be in the 3+ oxidation state. If any of the A ions are in the 3+ oxidation state, then δ will be greater than 0 to balance the charges. In one embodiment of the invention, A is only one metal chosen from Ce, Pr or Tb. However, in an alternative embodiment of the invention, A is two or more metals chosen from Ce, Pr and Tb, e.g. A is an 80:20 mixture of Ce and Pr. Most preferably, A is Ce.

B is in the 4+ oxidation state and is suitably one or more metals chosen from Ti, Sn, Ge, Ru, Mn, Ir, Os and Pb, including at least Ti. If B is more than one metal chosen from Ti, Sn, Ge, Ru, Mn, Ir, Os and Pb, then preferably at least 50 atomic percent of B is Ti. Preferably B is Ti or Ti and Sn or Ti and Ge. Most preferably B is Ti.

The compound suitably has the formula $(Na_{0.33}A_{0.66})_2B_2O_7$ (i.e. δ is 0) but can also be oxygen deficient (i.e. δ is greater than 0).

A preferred compound according to the invention is $(Na_{0.33}Ce_{0.66})_2Ti_2O_7$. Further preferred compounds are $(Na_{0.33}Ce_{0.66})_2Ti_{2-x}Sn_xO_7$, wherein x is from 0 to 0.9, $(Na_{0.33}Ce_{0.66})_2Ti_{2-y}Ge_yO_7$, wherein y is from 0 to 1 and $(Na_{0.33}Ce_{0.66-z}Pr_z)_2Ti_2O_7$, wherein z is from 0 to 0.2.

The compound can be made by hydrothermal synthesis. A salt of A in the 3+ oxidation state (e.g. $CeCl_3$) is mixed with more than two equivalents of a salt of B in the 3+ oxidation state (e.g. $TiF_3$) in the presence of a base (e.g. NaOH) and an oxidant (e.g. $H_2O_2$ or $NaBrO_3$) in an aqueous system. The reactants are heated to about 240° C. for a period of about 5 hours in a sealed container.

The invention further provides a catalyst comprising metal dispersed on a support material, wherein the support material is a compound of formula $(Na_{0.33}A_{0.66})_2B_2O_{7-\delta}$ as described above. The metal dispersed on the support material suitably comprises one or more precious metals (Au, Ag, Pt, Pd, Rh, Ir, Ru and Os) and is preferably gold or an alloy of gold. The loading of the catalytic metal is preferably between 0.1-20 wt %, based on the weight of the support material.

Metal can be dispersed on the surface of the $(Na_{0.33}A_{0.66})_2B_2O_{7-\delta}$ compound using techniques that are well known to those skilled in the art. One suitable method is incipient wetness impregnation wherein metal salts are made up into a solution such that the volume of solution is sufficient to fill the entire pore volume of the support material. The solution is added to the support material, the material is mixed thoroughly and then dried and calcined. Another suitable method is co-deposition wherein the support material is dispersed in a slurry containing metal salts. A base is added to deposit the metal onto the support material, and the catalyst is dried and calcined.

The catalysts according to the invention are active for the water gas shift reaction. Therefore in a further aspect the present invention provides a water gas shift process wherein water and carbon monoxide are passed over a catalyst of the invention, thereby providing hydrogen and carbon dioxide. The process is suitably carried out at a temperature of less than 400° C., preferably less than 250° C.

EXAMPLES

The invention will now be described by reference to examples which are intended to be illustrative and not limiting of the invention.

EXAMPLE 1

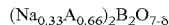
$(Na_{0.33}Ce_{0.66})_2Ti_2O_7$ $CeCl_3 \cdot 7H_2O$ (0.3707 g, 1 mmol) and $TiF_3$ (0.2622 g, 2.5 mmol) were weighed into a PTFE liner and $H_2O_2$ (35 wt %, 5 cm³) was added. NaOH (4M, 5 cm³) was added dropwise with stirring. The mixture was then stirred at room temperature for 30 minutes. The liner was then put into a stainless steel autoclave (23 ml capacity acid digestion bomb) and placed in an oven. The oven was heated at 16° C.min$^{-1}$ until 240° C., and the temperature was then held constant for 5 hours, before cooling to room temperature at a rate of 2.5° C.min$^{-1}$. The product was then washed in distilled water (~200 ml) at 80° C. for 30 minutes to remove any trace of NaF in the product. The product was filtered, washed with acetone and dried at 50° C.

XPS, XRD and chemical analysis confirmed that the product was $(Na_{0.33}Ce_{0.66})Ti_2O_7$ having the pyrochlore structure.

EXAMPLE 2

$(Na_{0.33}Ce_{0.66})_2Ti_2O_7$ $CeCl_3.7H_2O$ (0.3707 g, 1 mmol) and $TiF_3$ (0.2622 g, 2.5 mmol) were weighed into a PTFE liner and $NaBrO_3$ (0.5M, 5 cm$^3$) was added gradually with stirring. After complete addition of the bromate, the mixture was stirred for 5 minutes. NaOH (4M, 5 cm$^3$) was then added gradually and the mixture was then stirred for 30 minutes. The liner was then put into an autoclave and heated at 240° C. for 5 hours. The product was filtered and washed until the conductivity of the filtrate was less than 100 μS and then dried at 50° C. overnight.

EXAMPLE 3

$(Na_{0.33}Ce_{0.66})_2Ti_{1.5}Sn_{0.5}O_7$

This compound was prepared according to example 2 except that $Sn(CH_3COO)_4$ (0.5 mmol) and $TiF_3$ (2.0 mmol) were used instead of 2.5 mmol of $TiF_3$.

EXAMPLE 4

$(Na_{0.33}Ce_{0.66})_2Ti_{1.5}Ge_{0.5}O_7$

This compound was prepared according to example 2 except that $GeCl_4$ (0.5 mmol) and $TiF_3$ (2.0 mmol) were used instead of 2.5 mmol of $TiF_3$.

EXAMPLE 5

$(Na_{0.33}Ce_{0.66-z}Pr_z)_2Ti_2O_7$ $(0 \leq z \leq 0.4)$

This compound was preparing according to example 2 except that $Pr(NO_3)_3.6H_2O$ was added to the reaction mixture with the $CeCl_3.7H_2O$.

EXAMPLE 6

Au on $(Na_{0.33}Ce_{0.66})_2Ti_2O_7$ WGS catalyst

Pyrochlore produced according to example 1 (9.4 g) was slurried in water (400 ml) and warmed to 60° C. with stirring. The pH of the slurry was adjusted to 8.7 with addition of sodium carbonate solution (0.05M). $HAuCl_4$ (0.39 g, 49.24% Au) was dissolved in water (75 ml) and pumped into the slurry at about 10 ml/min. The pH of the slurry was allowed to fall to 8.0 and then maintained at this value by the addition of sodium carbonate solution (0.05M). When the gold addition was complete the slurry was stirred for 1 hour at 60° C. The catalyst sample was recovered by filtration, washed free of chloride ions on the filter bed and dried at 105° C.

COMPARATIVE EXAMPLE 1

Au on ceria WGS catalyst

Ceria (from Rhodia, 19.6 g) was slurried in water (800 ml) and the pH of the slurry was adjusted to 8.0 with the dropwise addition of lithium carbonate solution (0.1M). $HAuCl_4$ (0.81 g, 49.24% Au) was dissolved in water (150 ml). This solution was pumped into the slurry at about 10 ml/min. The pH was maintained at 8.0 by the simultaneous addition of lithium carbonate solution (0.1M). When the gold addition was complete the slurry was stirred for one hour. The catalyst was recovered by filtration, washed free of chloride ions on the filter bed and dried at 105° C.

COMPARATIVE EXAMPLE 2

Au on ceria-zirconia WGS catalyst $CeZrO_4$ from Rhodia was fired at 500° C. for 2 hours. 19.6 g of the fired support material was slurried in water (800 ml). The pH of the slurry was adjusted from approximately 4.0 to 8.0 by the careful addition of $Li_2CO_3$ solution (0.1M). $HAuCl_4$ (0.81 g, 49.24% Au) was dissolved in demineralised water and the volume made up to 200 ml. This solution was added dropwise over 25 mins to the stirred slurry of $CeZrO_4$. Throughout the gold addition the pH was maintained at 8.0 with the addition of further $Li_2CO_3$ (0.1M). After the addition was complete the slurry was stirred for a further 1 hour and then filtered. The catalyst was washed to remove chloride ions and then dried at 105° C. overnight.

EXAMPLE 7

WGS Activity

The catalysts of Example 6 and Comparative Examples 1 and 2 were tested for WGS activity across a range of temperatures. Catalyst samples were pelletised, crushed and sieved to give a fraction in the particle size range 250-355 μm. 0.45 g of catalyst was placed in a sample holder sitting inside a ceramic tube inside a three-zone furnace. Gases were introduced using mass flow controllers and water was fed to an evaporator via peristaltic pumps. The space velocity was 40,000 h$^{-1}$ and the gases were 5% CO, 30% $H_2O$ and $N_2$ balance. Inlet and outlet gas streams were dried and then passed to analysers to determine conversions Hydrogen was analysed using gas chromatography and CO and $CO_2$ using infra-red spectroscopy.

The activity of the catalysts (expressed as a % conversion of CO) versus temperature is shown in FIG. 1. The catalyst of the invention has better activity than the gold on ceria catalyst (comparative example 1) and has activity that is almost as good as the state-of-the-art gold on ceria-zirconia catalyst (comparative example 2).

The invention claimed is:

1. A catalyst comprising a metal dispersed on a support material, wherein the support material is a compound of formula $(Na_{0.33}A_{0.66})_2B_2O_{7-\delta}$ wherein A is one or more lanthanide metals; B is one or more metals selected from the group consisting of Ti, Sn, Ge, Ru, Mn, Ir, Os and Pb; and δ is a number in the range 0-1.

2. A catalyst according to claim 1, wherein the metal dispersed on the support material comprises a precious metal.

3. A catalyst according to claim 2, wherein the precious metal dispersed on the support material is selected from the list consisting of gold and an alloy of gold.

4. A water gas shift process comprising the step of passing water and carbon monoxide over a catalyst according to claim 1.

5. A catalyst according to claim 1, wherein A is one or more lanthanide metals selected from the group consisting of Ce, Pr and Tb.

6. A catalyst according to claim 1, wherein A is more than one lanthanide metal, and at least 70 atomic percent of A is Ce.

7. A catalyst according to claim 1, wherein A is Ce.

8. A catalyst according to claim 1, wherein B is Ti.

9. A catalyst according to claim 1, wherein B is Ti and Sn.

10. A catalyst according to claim 1, wherein B is Ti and Ge.

11. A catalyst according to claim 1, wherein $\delta$ is 0.

12. A catalyst according to claim 1, wherein the formula is $(Na_{0.33}Ce_{0.66})_2Ti_2O_7$.

* * * * *